United States Patent
Scoggins et al.

(10) Patent No.: US 7,477,850 B2
(45) Date of Patent: Jan. 13, 2009

(54) OPTICAL SIGNAL JITTER REDUCTION VIA ELECTRICAL EQUALIZATION IN OPTICAL TRANSMISSION SYSTEMS

(75) Inventors: John E. Scoggins, Dover, NH (US); James A. Siulinski, Westbrook, ME (US); Kenneth P. Snowdon, Falmouth, ME (US)

(73) Assignee: Agere Systems Inc., Allentown, PA (US)

( * ) Notice: Subject to any disclaimer, the term of this patent is extended or adjusted under 35 U.S.C. 154(b) by 409 days.

(21) Appl. No.: 11/263,285

(22) Filed: Oct. 31, 2005

(65) Prior Publication Data

US 2007/0098412 A1      May 3, 2007

(51) Int. Cl.
H04B 10/04  (2006.01)
H01S 3/00   (2006.01)

(52) U.S. Cl. .................... 398/193; 398/194; 372/38.02; 372/38.08

(58) Field of Classification Search ................ 398/158, 398/159, 193, 194; 372/38.02, 38.08
See application file for complete search history.

(56) References Cited

U.S. PATENT DOCUMENTS

| | | | |
|---|---|---|---|
| 6,212,229 B1 | 4/2001 | Salinger | |
| 2001/0035994 A1 | 11/2001 | Agazzi et al. | |
| 2002/0089996 A1 | 7/2002 | Komatsu et al. | |
| 2003/0235203 A1* | 12/2003 | Alderrou et al. | 370/445 |
| 2004/0013217 A1 | 1/2004 | Dietrich et al. | |
| 2004/0120426 A1* | 6/2004 | Dagdeviren et al. | 375/340 |
| 2004/0233949 A1* | 11/2004 | Wang | 372/38.02 |
| 2005/0175355 A1* | 8/2005 | Hauenschild et al. | 398/161 |
| 2006/0222134 A1* | 10/2006 | Eldredge et al. | 375/371 |

FOREIGN PATENT DOCUMENTS

WO  PCT/US2006/018959      8/2007

OTHER PUBLICATIONS

Conexant Multiport Framer Device Cuts Carrier Costs For Provisioning A Wider Range Of Broadband Services. Press Release [online]. Conexant System, Inc., 2000 [retrieved on Feb. 29, 2008]. Retrieved from the Internet: <url: http://www.conexant.com/servlets/DownloadNewsServlet/12112000-2.htm>.*

"DS90LV004 4-Channel LVDS Buffer/Repeater with Pre-Emphasis," National Semiconductor Corporation, pp. 1-7, Sep. 2005.

"Using Pre-Emphasis and Equalization with Stratix GX," Altera, White Paper, Version 1.0, pp. 1-11, Sep. 2003.

M. Shafer et al., "Connector and Chip Vendors Unite to Produce a High Performance 10 Gb/s NRZ-Capable Serial Backplane," Teradyne, Inc./Xilinx Inc., DesignCon 2003, High-Performance System Design Conference, 19 pages, 2003.

* cited by examiner

Primary Examiner—Jason Chan
Assistant Examiner—Nathan M Curs
(74) Attorney, Agent, or Firm—Ryan, Mason & Lewis, LLP

(57) ABSTRACT

An optical transmission system comprises an electrical source and an electrical-to-optical converter. The electrical source is adapted to provide an electrical signal at an output thereof. The electrical-to-optical converter has an input coupled to the output of the electrical source and is operative to convert the electrical signal to a corresponding output optical signal. The electrical source comprises a pre-emphasis circuit or other electrical signal equalization circuitry configurable to control a waveform of the electrical signal so as to produce a desired level of jitter in the output optical signal.

18 Claims, 3 Drawing Sheets

OPTICAL SIGNAL JITTER REDUCTION VIA ELECTRICAL EQUALIZATION IN OPTICAL TRANSMISSION SYSTEMS

FIELD OF THE INVENTION

The present invention relates generally to communication systems, and more particularly to optical transmission systems which convert electrical signals from one or more electrical sources to optical signals for transmission.

BACKGROUND OF THE INVENTION

In a typical optical transmission system, an electrical source drives an electrical-to-optical converter through a band-limited interconnect channel. For example, an electrical transmitter may be coupled to an electrical-to-optical converter via one or more traces of a circuit board formed of FR4 or another type of material.

A problem associated with such an arrangement is that the jitter on the output optical signal can increase due to effects of the interconnect channel and properties of the electrical-to-optical converter. Optical transmission systems designed to operate in accordance with well-known optical communications standards, such as the synchronous optical network (SONET) and synchronous digital hierarchy (SDH) standards, may specify a maximum amount of jitter that is considered acceptable for a given output optical signal. It is therefore particularly important in conventional optical transmission systems that the interconnect channel be of high quality, in order to maintain signal integrity and meet jitter specification requirements at the optical output.

Unfortunately, maintaining a high quality interconnect channel in an optical transmission system either adds cost by requiring more costly high performance materials, or it constrains the physical configuration and distance over which system components can be interconnected leading to lower density solutions or less flexible physical designs.

Accordingly, what is needed is a technique for providing a desired level of output optical signal jitter in an optical transmission system, in a manner which does not add significant cost to the system or unduly constrain the physical configuration and distance over which system components can be interconnected.

SUMMARY OF THE INVENTION

The present invention provides techniques for meeting optical output signal jitter specifications in optical transmission systems through the use of electrical signal equalization in an electrical signal source.

In accordance with one aspect of the invention, an optical transmission system comprises an electrical source and an electrical-to-optical converter. The electrical source is adapted to provide an electrical signal at an output thereof. The electrical-to-optical converter has an input coupled to the output of the electrical source and is operative to convert the electrical signal to a corresponding output optical signal. The electrical source comprises a pre-emphasis circuit or other electrical signal equalization circuitry configurable to control a waveform of the electrical signal so as to produce a desired level of jitter in the output optical signal.

In an illustrative embodiment, the electrical signal equalization circuitry of the electrical source comprises circuitry operative to increase high frequency content of the electrical signal in a manner that can correct for high frequency loss associated with not only an interconnect channel which connects the output of the electrical source to the input of the electrical-to-optical converter, but also the electrical-to-optical converter itself.

As indicated above, the electrical signal equalization circuitry may comprise a pre-emphasis circuit. In such an arrangement, the pre-emphasis circuit may be operative to increase an amplitude of a first bit after every transition in a data sequence of the electrical signal, relative to subsequent non-transitional bits in the sequence. More specifically, the pre-emphasis circuit may increase the amplitude of a first bit after every transition in a data sequence of the electrical signal from a first amplitude A1 associated with the subsequent non-transitional bits in the sequence to a second amplitude A2. Thus, each bit immediately after a transition may be set to a signal level of approximately +/−A2 while the subsequent non-transitional bits are set to signal levels of approximately +/−A1. The ratio of A2 to A1 may be in a range from approximately 110% to approximately 150%, and may be made selectable via a programmable controller or other type of control element. Numerous other types of pre-emphasis circuitry, or more generally equalization circuitry, may be used in implementing the invention.

The illustrative embodiment provides a number of significant advantages over the conventional techniques previously described. For example, as indicated above, applying equalization to the electrical signal can compensate for characteristics of both the interconnect channel and the electrical-to-optical converter. As a result, such equalization can reduce electrical and optical material costs and relax physical placement constraints for a given level of jitter performance, or it can improve jitter performance for a given material cost and physical placement constraint.

DETAILED DESCRIPTION OF THE INVENTION

The invention will be illustrated herein in conjunction with exemplary communication systems comprising one or more optical transmission systems. It should be understood, however, that the invention is more generally applicable to any optical transmission system involving electrical-to-optical signal conversion in which it is desirable to provide enhanced control of output optical signal jitter. The term "jitter" as used herein is intended to be construed broadly so as to encompass, by way of example, not only actual jitter measurements but other related characterizations of jitter, including those based on signal integrity measures such as signal rise and fall times, transmit eye openings, etc.

Figure 1:
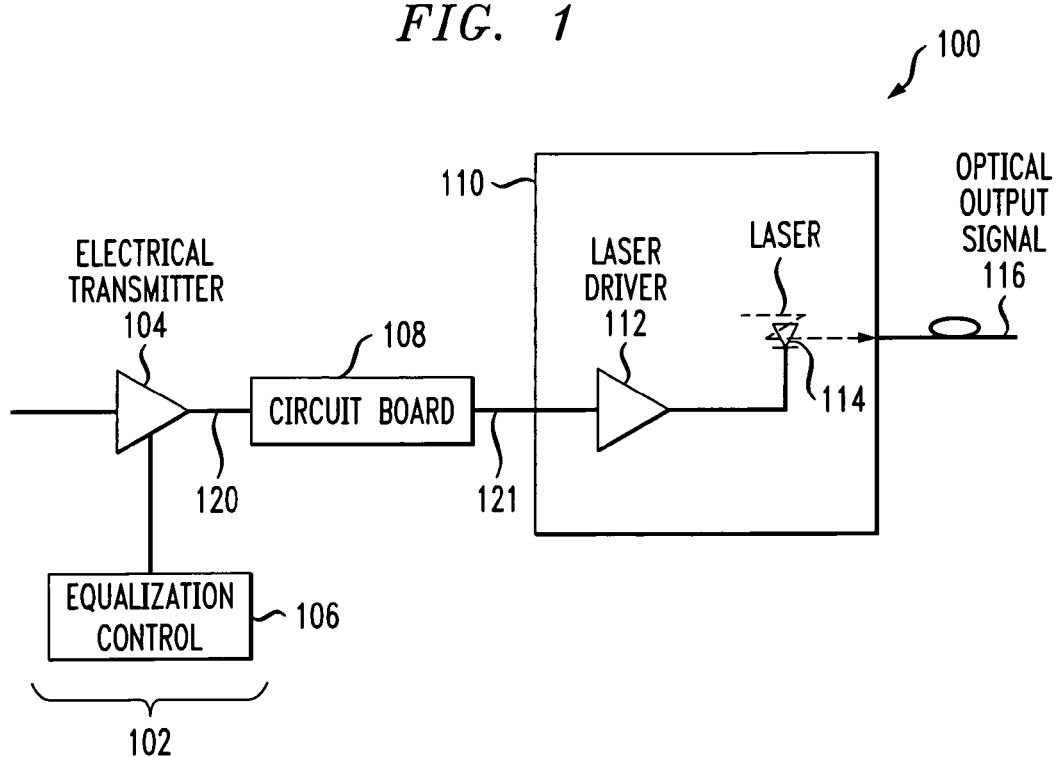
FIG. 1 shows an optical transmission system with an electrical source having an electrical signal equalization capability in an illustrative embodiment of the invention.

FIG. 1 shows an optical transmission system 100 in accordance with an illustrative embodiment of the invention. The system 100 comprises an electrical source 102 adapted to provide an electrical signal at an output thereof. The electrical source 102 in this embodiment further comprises an electrical transmitter 104 having an associated equalization control element 106 as shown, but numerous other types of electrical sources may be used in implementing the invention. It should be noted in this regard that the term "source" as used herein is intended to be construed broadly, and should not be construed as being limited to an originating source of a given signal. For example, the electrical source 102 may receive an input data stream from another system element and generate the output electrical signal from the input data stream. The equalization control element 106 may comprise, by way of example, a programmable controller, or a portion of such a controller in an embodiment in which there are multiple electrical sources subject to common control.

It is assumed that the electrical source 102 comprises electrical signal equalization circuitry, to be described in greater detail below, that is at least partially incorporated into the electrical transmitter 104. In other embodiments, such equalization circuitry may be implemented in an element that is separate from and coupled to an output of transmitter 104. Such equalization circuitry may, but need not, comprise an associated control element, such as control element 106 in FIG. 1. These and other arrangements are considered to be types of electrical sources having equalization circuitry, as that term is used herein.

The output of the electrical source 102 is coupled via a band-limited interconnect channel to an input of an electrical-to-optical converter 110. The interconnect channel in this embodiment comprises a physical interconnect trace on a printed circuit board 108. The circuit board 108 may be formed of an FR4 material, or other type of material commonly utilized in construction of such circuit boards, as will be appreciated by those skilled in the art, but the invention is not limited in terms of the particular type of interconnect used.

The electrical-to-optical converter 110 is operative to convert the electrical signal received from electrical source 102 via circuit board 108 to a corresponding output optical signal. This conversion is carried out using a laser driver 112 and laser diode 114 of the converter 110, in a manner consistent with well-known conventional practice. As a result of the conversion, an output optical signal is produced on output optical fiber 116. Because the laser driver 112 may have a band-limited frequency response, it can also be considered part of the band-limited interconnect channel that the electrical signal will be transmitted through. The laser driver 112 and laser diode 114 are often packaged together into a common physical component, such as a small form factor (SFF) optical module or a small form factor pluggable (SFP) optical module. In many applications, there is a jitter specification for the optical output signal.

It should be noted that at least a portion of the electrical-to-optical converter 110, such as laser driver 112, may be arranged on circuit board 108. The invention does not require any particular physical layout of these and other elements.

As indicated previously, a problem that can arise in conventional optical transmission systems relates to excessive jitter on the output optical signal due to effects of the interconnect channel and/or properties of the electrical-to-optical converter. For example, a transmit data stream may exhibit particular digital patterns or other waveform characteristics that cause the generated jitter in the optical output signal to violate the specification on optical output jitter required for conformance with common optical communication standards.

The system 100 of FIG. 1 advantageously overcomes this problem by providing, in the electrical source 102, the above-noted electrical signal equalization circuitry. This equalization circuitry is configurable to control a waveform of the electrical signal so as to produce a desired level of jitter in the output optical signal on fiber 116. For example, the desired level of jitter in the output optical signal may be a level of jitter that is less than or equal to a maximum specified output optical signal jitter of the optical transmission system 100.

As mentioned above, the electrical signal equalization circuitry in this embodiment is assumed to be at least partially incorporated into electrical transmitter 104, but is not explicitly shown in the figure. An example of such equalization circuitry is the pre-emphasis circuit shown in FIG. 5. The operation of the equalization circuitry in the electrical transmitter 104 is controlled by equalization control element 106, in a manner that will be described in greater detail below with reference to Tables 1 and 2 and FIGS. 4 and 5.

Although electrical equalization has previously been employed to compensate for the filtering effects of a channel in backplane electrical interconnect applications, it has not heretofore been applied to provide a desired level of jitter in an output optical signal of an optical transmission system such as system 100 of FIG. 1.

Figure 2:
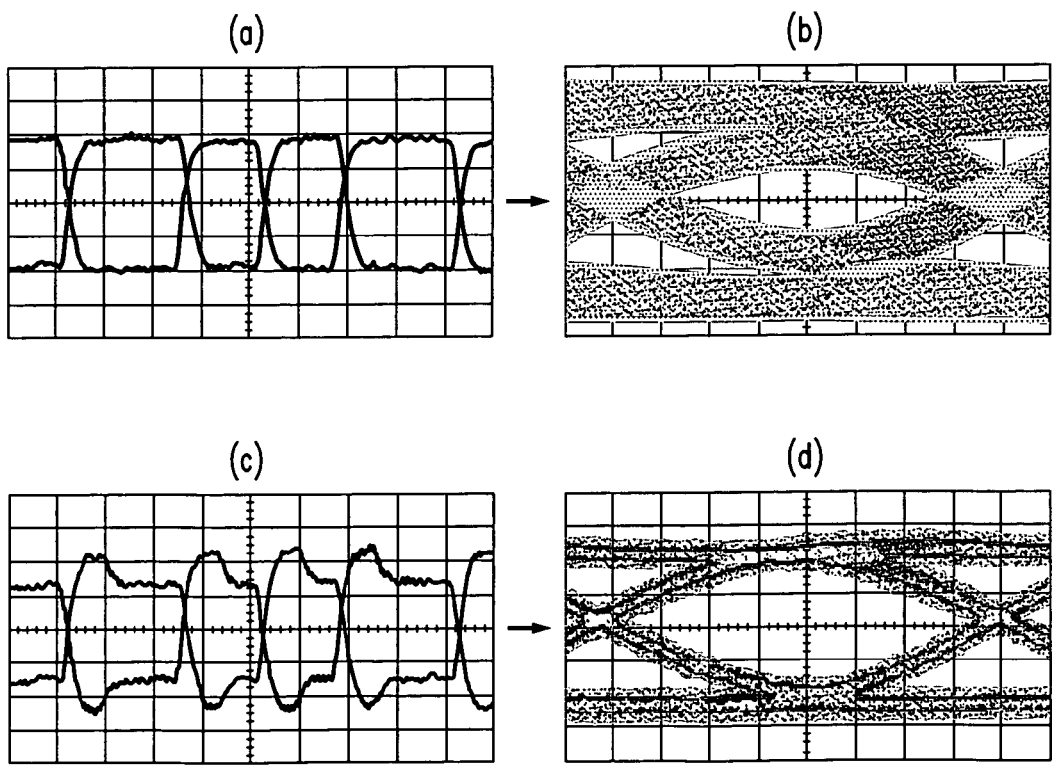
FIGS. 2(a) and 2(b) show an electrical transmit data stream at the input of an interconnect channel and a corresponding eye diagram at the output of the interconnect channel, respectively, with the equalization capability of the electrical transmitter in FIG. 1 disabled.
FIGS. 2(c) and 2(d) show an electrical transmit data stream at the input of an interconnect channel and a corresponding eye diagram at the output of the interconnect channel, respectively, with the equalization capability of the electrical transmitter in FIG. 1 enabled.

FIG. 2 illustrates the manner in which electrical signal equalization circuitry in electrical transmitter 104 can be used to provide a desired level of jitter in the optical signal at the output of the electrical-to-optical signal converter 110. FIG. 2(a) shows an example of an electrical signal comprising a transmit data stream at output 120 of the electrical transmitter 104. This transmit data stream results when the electrical equalization in the electrical transmitter 104 is disabled. That is, the FIG. 2(a) data stream represents a transmit data stream that is generated by transmitter 104 without the use of electrical equalization. FIG. 2(b) shows a corresponding eye diagram for the transmit data stream at output 121 of the interconnect channel comprising circuit board 108, that is, at the input of electrical-to-optical converter 110. It can be seen that the eye opening is narrow, which is indicative of a transmit data stream which will likely produce excessive jitter in the output optical signal.

Such jitter can be attributable, for example, to variation in the time position of the zero crossings in the transmit data stream, commonly referred to as inter-symbol interference, at the electrical-to-optical conversion point. In addition, the lack of high frequency components in the electrical signal at the electrical-to-optical conversion point can result in increased optical signal jitter due to other effects such as susceptibility to power supply noise, signal interference, or the dynamic response of the laser driver 112 and laser diode 114.

The use of electrical equalization in electrical transmitter 104 as described herein can produce at electrical transmitter output 120 a transmit data stream having a waveform of the type shown in FIG. 2(c). That is, FIG. 2(c) shows a transmit data stream having a waveform that has been adjusted using the electrical signal equalization circuitry of the electrical transmitter 104. This will result in an electrical signal at the electrical-to-optical conversion point that will have increased high frequency content. The variation in the time position of the zero crossings is reduced, resulting in reduced jitter in the optical output signal. The increased high frequency content of the signal can also counteract the other effects noted above that might otherwise result in increased jitter at the optical signal output. Techniques for generating a transmit data stream having a waveform of the type shown in FIG. 2(c) will be described below in conjunction with FIGS. 4 and 5.

FIG. 2(d) shows a corresponding eye diagram for the transmit data stream of FIG. 2(c) at the output 121 of the interconnect channel comprising circuit board 108. It is apparent that the eye opening of FIG. 2(d) is substantially wider than the eye opening of FIG. 2(b). This will result in a substantial reduction in output optical signal jitter, and is attributable to the use of the electrical signal equalization circuitry in the electrical transmitter 104.

It should be understood that the electrical equalization in the illustrative embodiment compensates not only for characteristics of the electrical interconnect channel, but also for characteristics of the electrical-to-optical converter. Thus, the optimal equalization will generally depend on the combined characteristics of the interconnect channel and the electrical-to-optical converter.

Figure 3:
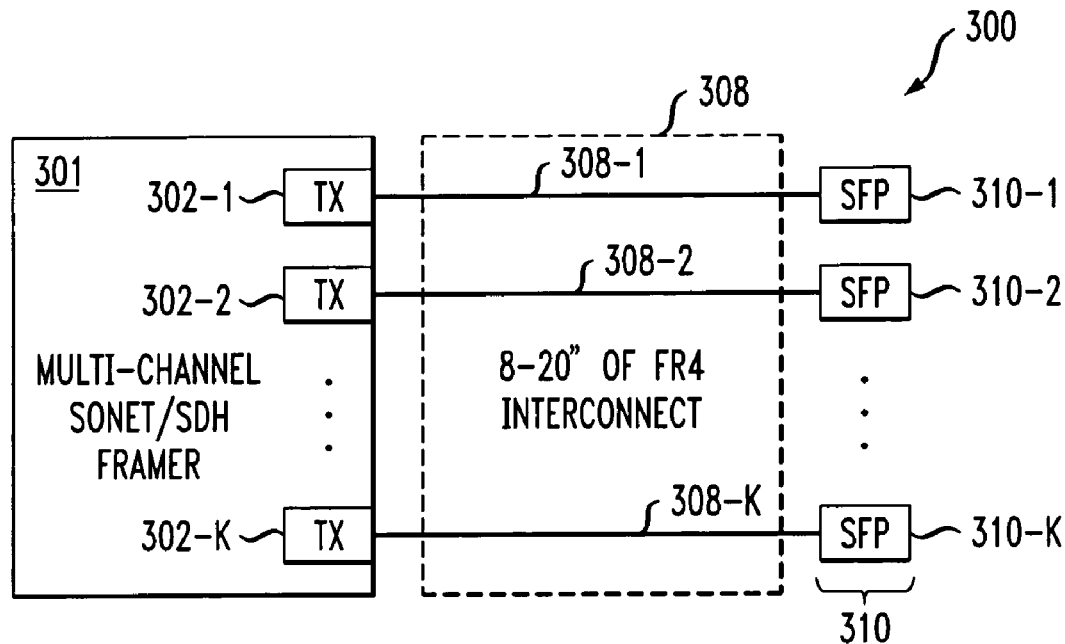
FIG. 3 illustrates the manner in which a system such as that shown in FIG. 1 may be utilized in an application involving a multi-channel SONET/SDH framer integrated circuit.

FIG. 3 shows one possible application of an optical transmission system with electrical signal equalization circuitry as described above. In this application, optical transmission system 300 comprises a multi-channel SONET/SDH framer 301. Typically, such a framer will be implemented in the form of an integrated circuit, although it could be implemented in other ways. The framer 301 comprises electrical sources 302-1, 302-2, . . . 302-K. These electrical sources, each of which is assumed to comprise electrical signal equalization circuitry, are coupled via respective interconnects 308-1, 308-2, . . . 308-K to respective electrical-to-optical converters in the form of SFP optical modules 310-1, 310-2, . . . 310-K The value of variable K may be 16, although higher or lower values can of course be used in a given embodiment.

The framer 301 may be, for example, configured in a manner similar to an otherwise conventional framer from the MARS™ family of framers, such as a MARS10G T-UniPHY or MARS10G T-ProPHY framer, available from Agere Systems Inc. of Allentown, Pa., U.S.A. The framing functions associated with these and other available framers are well known and therefore not described in detail herein.

Interconnects 308 in the illustrative embodiment of FIG. 3 comprise FR4 circuit board traces. Implementation-specific factors such as circuit board layout and physical constraints often result in the SFP modules being placed about eight to 20 inches away from their respective electrical transmitters of the framer integrated circuit 301. In some cases, a given interconnect may pass through multiple connectors, for example, when the framer and SFP modules are mounted on separate circuit boards. Without the use of electrical signal equalization circuitry in the electrical sources 302, the characteristics of a given interconnect channel and/or its associated electrical-to-optical converter may result in an excessive amount of jitter in the corresponding output optical signal, for reasons similar to those described previously herein.

By including electrical signal equalization circuitry in each of the electrical sources 302, the generated jitter as measured in the optical signals at the outputs of the respective SFP modules can be substantially reduced. For example, in one particular implementation of system 300, use of electrical signal equalization as described herein was found to reduce optical signal jitter from about 0.12 unit intervals peak-to-peak without equalization to about 0.08 unit intervals peak-to-peak with equalization, at a transmit data rate of 2.48 Gbs. The relative improvement is expected to be even greater at higher data rates, but the particular improvement achieved in any given implementation will generally depend on implementation-specific factors such as the characteristics of the interconnect, electrical-to-optical converter and other system elements. A typical SONET/SDH system jitter specification is 0.1 unit intervals peak-to-peak, so the reduction in jitter can be a significant portion of the allotted jitter specification. This allows the system to meet jitter specifications which would otherwise require a more costly means to achieve, or it allows more margin resulting in a higher quality design.

Jitter may be specified in other types of units. For example, jitter may be specified in unit intervals root-mean-squared (RMS) rather than unit intervals peak-to-peak as in the above illustration. These and numerous other types of jitter specifications can be addressed using the techniques of the invention.

It should be noted that the equalization circuitry as implemented in a given electrical source is preferably made programmable, via equalization control element 106 or other type of equalization controller. This can allow the system to flexibly accommodate the many different characteristics of various interconnect channels and optical components.

Thus, the waveform of a given electrical signal can be adjusted or otherwise controlled via the electrical signal equalization circuitry so as to produce a desired level of output jitter in the corresponding output optical signal. For example, one can monitor an amount of jitter in the output optical signal and adjust the waveform of the electrical signal until the desired level of jitter is achieved. The desired level of output jitter can be determined, again by way of example, by reference to a jitter specification, by using rise and fall times, eye diagrams or other performance-based measures, or via other suitable techniques.

Although the optical transmission system 300 utilizes a multi-channel framer integrated circuit, the invention can be applied in a similar manner to numerous other integrated circuit applications.

Equalization can be implemented in a given one of the electrical sources 102 or 302 using any one of a number of techniques. For example, if one assumes that the collective characteristics of the interconnect channel and the electrical-to-optical converter can be modeled as a low pass filter function, then any equalization implementation that suitably increases the high frequency content of the transmit data signal, in a manner that closely corrects for the high frequency loss encountered in the interconnect channel and electrical-to-optical converter, can serve to provide a suitable equalization capability. A high frequency boosting function of this type can be implemented using, for example, complex filter functions with a high degree of accuracy, or it can be implemented with simple filter functions that adequately serve the application, as will be appreciated by those skilled in the art.

Figure 4:
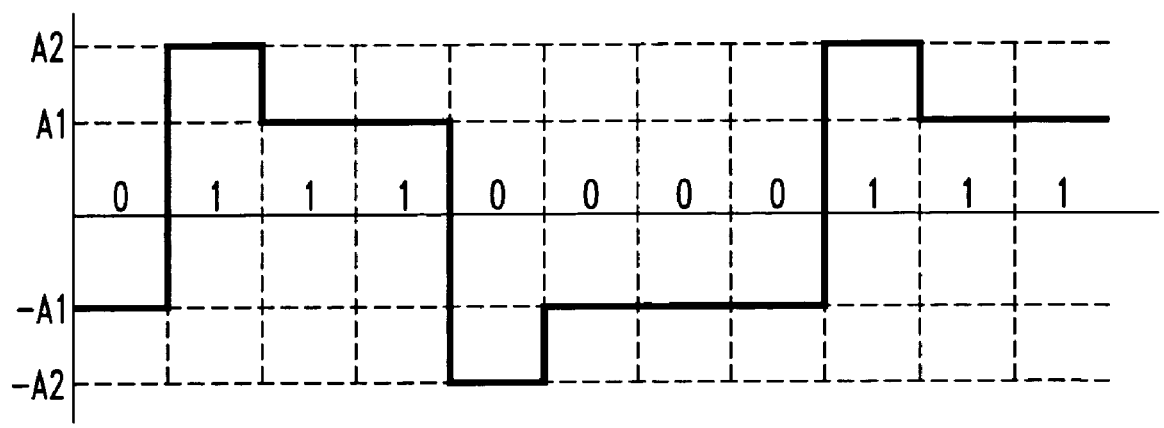
FIG. 4 is a diagram showing one manner in which electrical equalization in the form of electrical pre-emphasis can be applied to a transmit data stream in an electrical transmitter of the FIG. 1 system.
Figure 5:
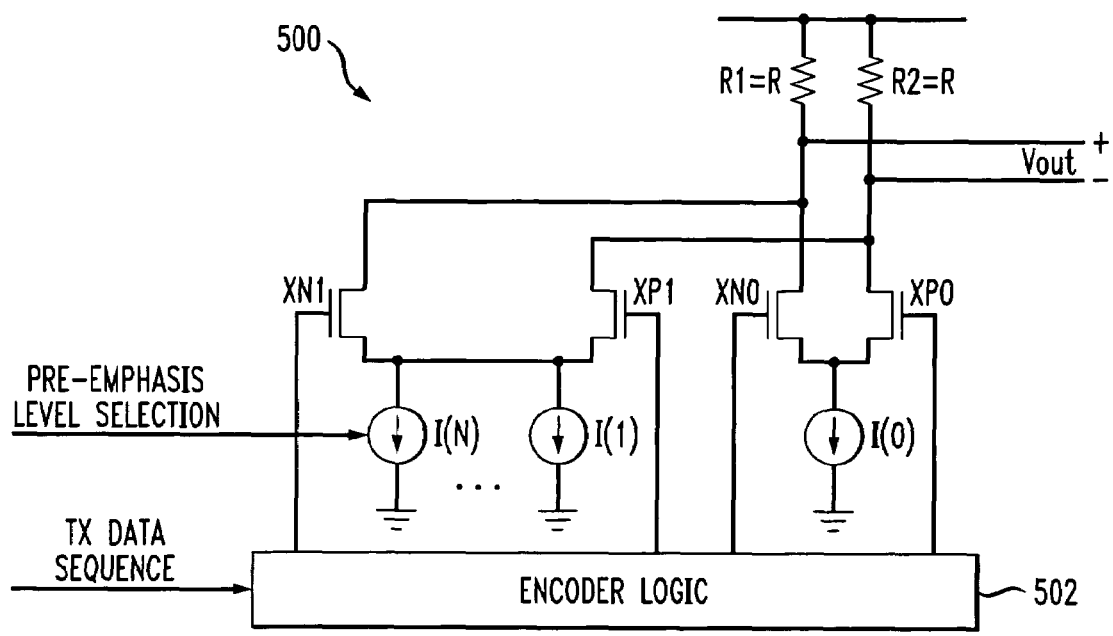
FIG. 5 shows a pre-emphasis circuit that may be used in the electrical transmitter of the FIG. 1 system to generate the electrical signal waveform shown in FIG. 4.

One simple pre-emphasis approach that can be used in an optical transmission system with two-level binary signaling involves increasing the amplitude of the first bit after every transition in the data pattern, relative to the following non-transitional bits in the sequence. An example of a pre-emphasis technique of this type will now be described with reference to FIGS. 4 and 5. It is assumed for purposes of illustration that the technique is applied in electrical source 102, although similar techniques may be applied to each of the electrical sources 302 in the FIG. 3 system. FIG. 4 generally illustrates the manner in which a transmit data stream waveform is altered in accordance with the pre-emphasis, while FIG. 5 shows a circuit that may be used to provide the pre-emphasis.

Referring initially to FIG. 4, each bit immediately after a transition in the transmit data stream is set to an amplitude of +/−A2 while all subsequent non-transitional bits are set to an amplitude of +/−A1, where A2 is greater than A1. This has the effect of increasing the high frequency content of the transmit data stream waveform in a manner than can be used to compensate for the low pass filtering effect of the interconnect channel and electrical-to-optical converter. The resulting waveform, shown in FIG. 4, is similar to the data stream waveform previously described in conjunction with FIG. 2(c).

The amount of pre-emphasis can be expressed as a percentage based on the ratio of A2 to A1. The optimal amount of pre-emphasis will typically vary based on the characteristics of the interconnect channel and electrical-to-optical converter. By way of example, the optimal amount of pre-emphasis for a given application can be determined empirically by varying the amount of pre-emphasis and measuring the jitter on the optical output signal. Once the optimum amount of pre-emphasis is determined, it can be fixed for a given interconnect channel and electrical-to-optical converter configuration.

Table 1 below shows the amplitude encoding associated with the FIG. 4 pre-emphasis approach as a function of the current and previous bits of the sequence.

TABLE 1

| Current bit | Previous bit | Current Amplitude |
|---|---|---|
| 0 | 0 | −A1 |
| 0 | 1 | −A2 |
| 1 | 0 | A2 |
| 1 | 1 | A1 |

As indicated previously, a pre-emphasis circuit suitable for generating the FIG. 4 waveform is shown in FIG. 5. The pre-emphasis circuit 500 comprises encoder logic 502 which receives a transmit data stream as input and supplies logic signals to respective gates of transistors XN0, XN1, XP0 and XP1. Pre-emphasis level selection inputs, provided from equalization control element 106 or another type of controller, are used to control the currents I(1) through I(N), at least one of which is present in a given implementation. The circuit 500 uses a current mode logic (CML) configuration to create an appropriate waveform at Vout by having the logic signals on the respective gates of transistors XN0 and XP0 steer the current I(0) through load resistors R1 or R2. The amplitude of the output signal will be proportional to the value of the resistors R1 and R2, and the magnitude of the current I(0). In order to implement a pre-emphasis function which can create a waveform such as that shown in FIG. 4, one or more of the additional currents I(1) through I(N) are added to or subtracted from the primary current I(0) in the load resistors R1 and R2.

The amplitude of the output waveform is given in Table 2 based on the case of two current sources, I(0) and I(1), and R1=R2=R. One example of a nominal value for R is about 50 ohms, although other values can of course be used, as will be appreciated by those skilled in the art. By having the encoder logic 502 sequence the gates of transistors XN0, XN1, XP0 and XP1 according to the input data sequence and the encoding given in Table 1, a waveform can be created that has the characteristics shown in FIG. 4.

TABLE 2

| XN1 | XP1 | XN0 | XP0 | Vout |
|---|---|---|---|---|
| 1 | 0 | 1 | 0 | [−I(0) − I(1)] * R = −A2 |
| 1 | 0 | 0 | 1 | [I(0) − I(1)] * R = A1 |
| 0 | 1 | 1 | 0 | [−I(0) + I(1)] * R = −A1 |
| 0 | 1 | 0 | 1 | [I(0) + I(1)] * R = A2 |

The encoder logic 502 can be configured in a straightforward manner to provide the output logic signals shown in Table 2 based on current and previous bits of the data sequence, so as to implement the desired encoding from Table 1.

The pre-emphasis circuit 500 can be configured to allow multiple selectable values for the currents I(1) through I(N), thereby allowing the user to create a selectable ratio of amplitude A2 to amplitude A1. Such a selection capability can be provided via a programmable controller or other type of control element. Various circuit parameters, such as the current values, the number of settings, and the resolution of the settings, can vary depending on the level of precision required in the application. Typical practical applications may require ratios of A2 to A1 that range from approximately 110% to 150% with resolutions on the order of 10%, although larger or smaller ranges and resolutions could be used for other applications. These parameters can be selected as a design parameter without loss of generality.

A wide variety of other types of equalization circuitry may be utilized to provide a waveform of the type shown in FIG. 4 or other equalized waveform suitable for use with the present invention. For example, a digital-to-analog (D/A) converter can be used to provide the needed output amplitudes, with appropriate encoder logic being used to drive the D/A converter to the correct output level based on the data sequence.

It is to be appreciated that the particular pre-emphasis approach illustrated in conjunction with FIGS. 4 and 5 is presented by way of example only, and numerous other types of electrical equalization circuitry may be used in implementing the present invention. Also, the particular optical transmission system configurations shown in FIGS. 1 and 3 should be considered illustrative examples. Other embodiments of the invention can include different types and arrangements of components.

The present invention as set forth in the illustrative embodiments described above provides a number of significant advantages relative to conventional practice. For example, applying equalization to the electrical signal can compensate for characteristics of both the interconnect channel and the electrical-to-optical converter. Thus, it can reduce electrical and optical material costs and relax physical placement constraints for a given level of jitter performance, or it can improve jitter performance for a given material cost and physical placement constraint.

The present invention may be implemented in the form of one or more integrated circuits. For example, a given electrical source with electrical signal equalization circuitry may be implemented as one or more integrated circuits, or multiple such sources can be implemented on a single integrated circuit. Numerous other configurations are possible.

In a given integrated circuit implementation, identical die are typically formed in a repeated pattern on a surface of a semiconductor wafer. Each die includes an electrical source or other device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Numerous alternative embodiments within the scope of the following claims will be readily apparent to those skilled in the art.

What is claimed is:

1. An optical transmission system comprising:
    an electrical source adapted to provide an electrical signal at an output thereof; and
    an electrical-to-optical converter having an input coupled to the output of the electrical source and being operative to convert the electrical signal to a corresponding output optical signal;
    the electrical source comprising electrical signal equalization circuitry configurable to control a waveform of the electrical signal so as to reduce jitter in said output optical signal;
    wherein the electrical signal equalization circuitry comprises electrical signal pre-emphasis circuitry; and
    wherein the electrical signal pre-emphasis circuitry is operative to increase an amplitude of a first bit after every transition in a data sequence of the electrical signal, relative to subsequent non-transitional bits in the sequence.

2. The system of claim 1 wherein the electrical source comprises an electrical transmitter having an associated equalization control element.

3. The system of claim 1 wherein said output optical signal has a level of jitter that is less than or equal to a specified output optical signal jitter of the optical transmission system.

4. The system of claim 1 wherein the electrical source receives an input data stream from another system element and generates the electrical signal from said input data stream.

5. The system of claim 1 wherein the electrical signal equalization circuitry of the electrical source comprises circuitry operative to increase high frequency content of the electrical signal in a manner that corrects for high frequency loss associated with at least one of:
    (i) an interconnect channel which connects the output of the electrical source to the input of the electrical-to-optical converter; and (ii) the electrical-to-optical converter itself.

6. The system of claim 1 wherein the electrical signal pre-emphasis circuitry is operative to increase the amplitude of a first bit after every transition in a data sequence of the electrical signal from a first amplitude A1 associated with the subsequent non-transitional bits in the sequence to a second amplitude A2.

7. The system of claim 6 wherein each bit immediately after a transition is set to a signal level of approximately +/−A2 while the subsequent non-transitional bits are set to signal levels of approximately +/−A1.

8. The system of claim 6 wherein the pre-emphasis circuit is configured to provide a ratio of A2 to A1 that is in a range from approximately 110% to approximately 150%.

9. The system of claim 6 wherein the pre-emphasis circuit is configured to provide a selectable ratio of amplitude A2 to amplitude A1.

10. The system of claim 1 wherein the output of the electrical source is coupled to the input of the electrical-to-optical converter by an interconnect comprising a circuit board trace having a length of between about eight and 20 inches.

11. The system of claim 1 wherein the electrical source comprises one of a plurality of electrical transmitters of a multi-channel integrated circuit, said electrical transmitters providing respective electrical outputs of the multi-channel integrated circuit, each of said electrical transmitters having an output coupled to an input of a corresponding one of a plurality of electrical-to-optical signal converters located external to said multi-channel integrated circuit.

12. The system of claim 11 wherein the multi-channel integrated circuit comprises a SONET/SDH framer.

13. The system of claim 1 wherein the electrical source is implemented at least in part as an integrated circuit.

14. An integrated circuit for use in an optical transmission system, the system comprising an electrical-to-optical converter, the integrated circuit comprising:
    an electrical source adapted to provide an electrical signal at an output thereof;
    the output of the electrical source being connectable to an input of the electrical-to-optical converter;
    the electrical source comprising electrical signal equalization circuitry configurable to control a waveform of the electrical signal so as to reduce jitter in an output optical signal generated by the electrical-to-optical converter;
    wherein the electrical signal equalization circuitry comprises electrical signal pre-emphasis circuitry; and
    wherein the electrical signal pre-emphasis circuitry is operative to increase an amplitude of a first bit after every transition in a data sequence of the electrical signal, relative to subsequent non-transitional bits in the sequence.

15. The integrated circuit of claim 14 comprising a multi-channel integrated circuit having a plurality of electrical transmitters, said electrical source comprises one of the plurality of electrical transmitters, said electrical transmitters providing respective electrical outputs of the multi-channel integrated circuit, each of said electrical transmitters having an output connectable to an input of a corresponding one of a plurality of electrical-to-optical signal converters located external to said multi-channel integrated circuit.

16. The integrated circuit of claim 15 wherein said multi-channel integrated circuit compromises a SONET/SDH framer.

17. A method for use in an optical transmission system comprising an electrical source adapted to provide an electrical signal at an output thereof, and an electrical-to-optical converter having an input coupled to the output of the electrical source and being operative to convert the electrical signal to a corresponding output optical signal, the method comprising the step of:
    controlling a waveform of the electrical signal so as to reduce jitter in said output optical signal;
    wherein the controlling step comprises increasing an amplitude of a first bit after every transition in a data sequence of the electrical signal, relative to subsequent non-transitional bits in the sequence.

18. The method of claim 17 further including the step on monitoring an amount of jitter in said output optical signal and adjusting the waveform of the electrical signal unit at least a specified level of jitter is achieved.

* * * * *